United States Patent [19]

Ellis, Sr. deceased et al.

[11] 4,207,993
[45] Jun. 17, 1980

[54] CRICKET DISPENSER

[76] Inventors: Doyce F. Ellis, Sr. deceased, late of Oglethorpe, Ga.; By Ira N. J. Ellis, administrator, P.O. Box 371, Oglethorpe, Ga. 31068

[21] Appl. No.: 889,542

[22] Filed: Mar. 23, 1978

[51] Int. Cl.² ............................................. A01K 97/04
[52] U.S. Cl. ...................................... 221/256; 43/55; 221/266
[58] Field of Search ............... 221/167, 255, 256, 263, 221/266; 222/367, 368, 366; 43/55

[56] References Cited

U.S. PATENT DOCUMENTS

| | | | |
|---|---|---|---|
| 2,718,089 | 9/1955 | Heaton | 43/55 |
| 2,878,964 | 3/1959 | Avis | 221/263 |
| 2,883,788 | 4/1959 | Stitt | 43/55 |
| 3,204,834 | 9/1965 | Gadenne | 221/266 X |
| 3,308,570 | 3/1967 | Horton | 43/55 |
| 3,318,491 | 5/1967 | Williamson | 221/266 X |
| 4,030,226 | 6/1977 | Shelton, Sr. et al. | 43/55 |

Primary Examiner—David A. Scherbel
Assistant Examiner—Edward M. Wacyra
Attorney, Agent, or Firm—Mason, Fenwick & Lawrence

[57] ABSTRACT

A cricket dispenser has a hollow tubular container with a conical funnel portion on one end formed of transparent plastic with a rotary transfer disc having a plurality of inwardly extending recesses extending in from its edge being mounted adjacent the apex of the conical portion so that alignment of one of the recesses with the interior of the conical portion permits a cricket in the container to enter the recess head first as a result of its natural instinct. The disc can then be rotated to a second position to present the tail portion of the cricket in the recess to the user to permit easy removal of the cricket by the user. A shroud encloses the disc for preventing escape of the cricket until the disc is in the proper position to permit controlled removal of the cricket; the shroud is of transparent plastic to permit visual confirmation of the presence of a cricket in the disc prior to rotation of the disc for dispensing the cricket.

12 Claims, 4 Drawing Figures

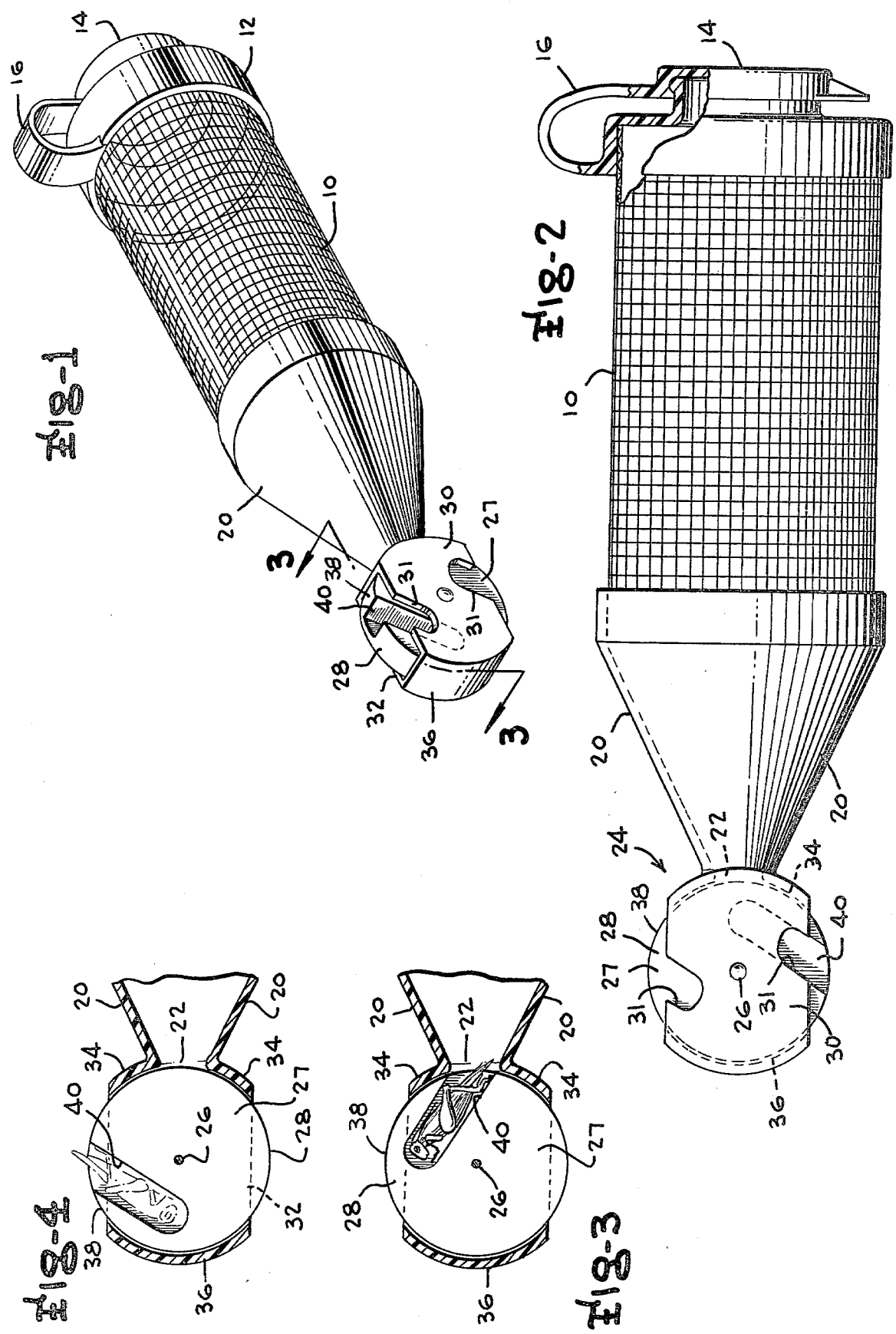

CRICKET DISPENSER

This invention is in the field of storing and dispensing live crickets which are frequently used as bait by fishermen. More specifically, the invention is directed to the unique cricket storing and dispensing means which presents individual crickets tail first to the user to permit the easy and certain grasping and holding of the cricket for insertion on the fish hook of a user.

It is well known that live crickets constitute one of the best fish baits for panfish such as bream and it is also equally well known among those who have used live crickets for bait that they are probably the most vexacious and troublesome of all known baits due to the fact that they have a strong inclination toward escape which is coupled with a substantial physical capacity for fulfillment. Numerous devices such as that disclosed in U.S. Pat. Nos. 2,579,549; 2,587,899, 2,718,088; 2,718,089, 2,745,209; 2,846,807; 2,883,788; 3,308,570; 3,755,956 and 4,030,226 have been proposed for storing and dispensing crickets. The most common prior known device comprises a container having a conical end portion with a small exit opening at the apex of the conical portion which is normally closed with a cork or the like. Removal of the cork permits one or more of the crickets in the interior of the container to move outwardly of the opening in a head first manner to be received into the hand of the user. Unfortunately, crickets have extremely strong rear legs and they frequently leap to freedom from the grasp of the user or as soon as the cork is removed from the exit opening. Another problem with the foregoing prior type of cricket dispenser is that a plurality of crickets will sometimes suddenly leap from the exit opening in the conical portion of the container while the user is attempting to grasp the first cricket and impale him on the fishhook and replace the cork in the opening of the conical portion, a procedure difficult to achieve with only two hands. Successful use of the foregoing type of dispenser consequently requires a substantial amount of manual dexterity and devices of this type having long been recognized as not providing fully satisfactory service as evidenced by the various prior art patents proposed for dispensing crickets in a more precise and foolproof manner. Unfortunately, none of the prior known devices provides entirely satisfactory results; for example, many of the devices present the cricket to the user in a head first manner or simply drop it into the hand of the user which frequently permits the escape of the cricket. Other prior known devices are less prone to permit escape of the cricket in that they clamp or physically restrain the cricket for presentation to the user; unfortunately, the success of these devices in preventing escape of the cricket is largely due to the fact that such devices by their operation frequently maim, cripple and otherwise inflict severe bodily harm on the crickets so that they lose their physical capacity to escape; regrettably, usefulness of crickets as bait decreases significantly with physical injury. Moreover, others of the prior devices are overly complicated and consequently expensive to manufacture.

Therefore, it is the primary object of this invention to provide a new and improved cricket dispenser.

Achievement of the foregoing object is enabled by the preferred embodiment of the invention which represents a substantial departure from previously known cricket dispensing devices in that it presents crickets to the user in a tail orientation while preventing forward movement of the cricket. The advantage of the preferred embodiment in presenting the cricket in a tail first manner resides in the fact that crickets can only move at a high speed in a forward manner similar to that of a grasshopper by reliance upon the propelling force of their extremely strong rear legs. The rear legs of a cricket do not enable a rapid rearward movement of the insect and any rearward motion is enabled largely by the relatively weak front legs and is of minimal velocity so that a rearwardly moving cricket does not present any substantial escape possibility. However, it is very difficult for a user to catch or restrain a forwardly moving cricket, since the rear legs are extremely powerful and can propel the insect at a high velocity for several feet.

More specifically, the preferred embodiment of the invention consists of a cylindrical container formed of plastic or wire and having a relatively large removable cap on one end for permitting the filling of the container with a desired number of crickets. The other end of the container comprises a plastic member that is preferably transparent and is of conical configuration tapering down to a discharge or exist opening at or near the apex of the conical portion. A unitary plastic shield or shroud extends outwardly from the conical portion and includes two spaced parallel plate elements oriented in planes parallel to the axis of the cylindrical component with a rotary transfer disc being mounted for rotation about a pin extending perpendicular to and between the plate elements.

An inate characteristic of crickets relied upon by this invention is that they tend to crawl into recesses, cracks and the like, apparently as a result of a self-preservation instinct. More specifically, a plurality of inwardly extending recesses are provided in the transfer disc with each recess being of a shape and size to permit the movement of a cricket into the recess which movement occurs as a result of the instinctive tendency of crickets to move into such openings. The edge of the disc is positioned in the discharge or exit opening of the conical portion so that alignment of one of the recesses with the discharge opening permits a cricket on the interior of the container to enter the recess in a head first manner following its natural self-preservation instinct. The transfer disc is then rotated to a second position in which the recess containing the cricket is positioned in a position facing outwardly and accessible to the hand of the user. Since the cricket always enters the recess in a head first manner, the tail and the rear legs of the cricket are presented to the user and are easily grasped by the user to permit an easy removal of the cricket from the recess. Moreover, rotation of the disc immediately closes the discharge opening from the conical portion after the recess leaves the alignment position with the discharge opening so that it is impossible for other crickets to escape from the device. Consequently, the container is always maintained in a closed condition, and it is practically impossible for the crickets to escape. Since the crickets are grasped by their tail portions with their rear legs also being grasped by the user, they are immobilized so that it is impossible for them to escape prior to their positioning on the fishhook of the user. The plastic plates along opposite sides of the disc are made of transparent material in the same manner as the conical portion of the container so that the operation is always visible to the user and he can confirm that a cricket has fully entered the recess aligned with the discharge opening prior to rotation of the disc. If no cricket has entered the recess, it is a relatively simple matter to shake the container slightly to position a cricket near the discharge opening so that he will become aware of the recess and follow his natural inclination to enter the recess in the transfer disc.

A better and more complete understanding of the nature and operation of the preferred embodiment will be achieved when the following detailed description is considered in conjunction with the appended drawings, in which:

FIG. 1 is a perspective view of the preferred embodiment;

FIG. 2 is a side elevation of the preferred embodiment;

FIG. 3 is a sectional view taken along lines 3—3 of FIG. 1 illustrating the parts in a first position with the disc positioned in communication with the interior of the container for receiving a cricket therefrom; and FIG. 4 is a sectional view similar to FIG. 3 but illustrating the transfer member in a discharge position.

Turning now to the drawings, the preferred embodiment of the invention comprises a tubular container consisting of a cylindrical wire or plastic tube 10 having a plastic fitting 12 on one end which includes a relatively large closure lid 14 covering an opening in the fitting 12 through which crickets are normally provided into the interior of the tubular container 10. The lid 14 is connected by flexible band 16 to the body of fitting 12 to prevent the loss of the lid. The foregoing construction is conventional and requires no further discussion.

The end of tubular container member 10 opposite the end to which the fitting 12 is connected is provided with a conical end portion 20 attached to the tubular member and tapering downwardly to provide an axial discharge opening 22 positioned axially with respect to the conical end portion 20 in the area adjacent the apex of the conical end portion as shown in the drawings. A shroud or shield, generally designated 24, extends unitarily from the conical end portion 20 and includes a pivot pin 26 on which a rotary transfer member comprising a plastic disc 28 is mounted for rotation. Shroud 24 includes first and second spaced parallel plates 30 and 32 between which the pin 26 extends with the inner faces of plates 30 and 32 facing and being closely adjacent to the opposite sides of the disc 28. Additionally, shroud 24 includes first and second cylindrical wall portions 34 and 36 concentric with the axis of pin 26 and the axis of disc 28 and closely spaced from the outer edge 38 of the disc 28. Cylindrical wall portion 34 is separated into two portions by the discharge opening 22.

Disc 28 includes at least one inwardly extending slot-like recess 40 which is oriented along a chordal line of the disc 28. It will be observed that the recess 40 preferably does not extend all the way through the thickness of the disc 28 but only extends inwardly from the face 27 of the disc. However, the slot-like recess 40 could extend through the entire thickness of the disc if desired.

Operation of the device will now be discussed with reference being made to FIG. 3 which illustrates the recess 40 in a first position aligned with the discharge opening 22 so as to permit a cricket to enter the recess by following the cricket's natural inclination to crawl into such spaces. When the cricket is in the recess, this fact will be apparent to the user since the conical portion 20 and the side plates 30 and 32 of the shroud are the substantially transparent material. The user then rotates the disc 28 to a second position illustrated in FIG. 4 in which the recess 40 is aligned with one of the two slots 31 in the first plate 30 so that the tail and rear legs of the cricket are presented to the user who simply grasps these portions of the insect and removes it from the recess or slot. It will be observed that the rotation of the disc 28 from the position of FIG. 3 immediately closes the opening 22 and it is consequently impossible for any of the other crickets within the container to escape. Also, it should be observed that the wheel 28 can be rotated to position the slot 40 in alignment with either of the slots 31 provided in the plate 30. While it is possible for the cricket in the slot positioned in the discharge position of FIG. 4 to back outwardly of the slot, such movement is quite slow and the cricket can be easily captured during such movement before it reaches a position in which it could move in a forward direction. Moreoever, even if the cricket backs completely out of the slot, it appears to be disoriented momentarily during which time it can be easily caught by the hand of the user. However, the cricket is normally engaged by its tail and rear leg portions immediately upon positioning of the slot in the discharge position of FIG. 4 prior to any rearward movement of the cricket in the slot 40. A detent such as a light spring engaging a recess in the side of disc 28 can be used for lightly maintaining the disc in either of the positions of FIGS. 3 or 4 if desired. The recess 40 is dimensional and shaped to prevent the cricket from turning around while in the recess.

Thusly, the preferred embodiment of the invention always presents the cricket in a tail first manner to permit the easy removal of the cricket from the slot by the user with little or no likelihood of escape. Moreover, the disc 28 is not rotated until the cricket is fully within the compounds of the slot 40 and there is consequently practically no possibility of damage or injury to the cricket during the dispensing operation. The fact that the slot-like recess 40 does not extend through the entire thickness of disc 28 results in protection of the cricket during movement of disc 28 so as to reduce the possibility of injury to the cricket.

Numerous modifications of the preferred embodiment will undoubtedly occur to those skilled in the art and it should be understood that the spirit and scope of the invention is to be limited solely by the appended claims.

I claim:

1. A cricket dispenser comprising a container means capable of housing a plurality of live crickets, a movable transfer member comprising a rotary disc adjacent said container means, said rotary disc including a surface defining an open recess opening extending inwardly from a peripheral edge portion of said rotary disc and oriented along a chord of said disc spaced from the diameter of said disc and being of sufficient size to receive and hold a cricket, transfer member support means supporting said rotary disc for movement between a first position in which said recess opening communicates with the interior of said container to permit a cricket in said container to enter said recess opening head first and a second position in which said recess opening faces outwardly externally of said container to position the tail and rear legs of a cricket in said recess toward a user to permit the tail and legs of the cricket to be accessible to the user externally of said container and shroud means positioned to cover said recess opening while said rotary disc is being moved from said first position to said second position.

2. The invention of claim 1, wherein said transfer member support means comprises pin means mounted on said shroud means and wherein said rotary disc is supported for rotation of said pin means.

3. The invention of claim 1, wherein said transfer member support means comprises pin means mounted on said shroud means and said rotary disc is mounted for rotation on said pin means and wherein said container includes a conical end portion having an axial opening in its apex portion, said axial opening being positioned adjacent the peripheral edge portion of said rotary disc to permit a cricket to move through said axial opening into said recess opening when said rotary disc is in its first position.

4. The invention of claim 1, wherein said transfer member support means comprises pin means mounted on said shroud means and said rotary disc is mounted for rotation on said pin means and wherein said container includes a conical end portion having an axial opening in its apex portion, said axial opening being positioned adjacent the peripheral edge portion of said rotary disc to permit a cricket to move through said axial opening into said recess opening when said rotary disc is in its first position wherein said shroud means includes a planar wall portion extending outwardly from said conical end portion at a location adjacent said axial opening in said conical end portion and cylindrical wall means concentrically surrounding said rotary disc.

5. The invention of claim 4, wherein said cylindrical wall means comprises first and second cylindrical wall portions separated by a slot in said shroud through which the peripheral edge portion of said disc extends.

6. The invention of claim 1, wherein said shroud is formed of transparent plastic material.

7. The invention of claim 6, wherein said transfer member support means comprises pin means mounted on said shroud means and wherein said rotary disc is supported for rotation on said pin means.

8. The invention of claim 6, wherein said transfer member support means comprises pin means mounted on said shroud means and said rotary disc is mounted for rotation on said pin means and wherein said container includes a conical end portion having an axial opening in its apex portion, said axial opening being positioned adjacent the peripheral edge portion of said rotary disc to permit a cricket to move through said axial opening into said recess when said rotary disc is in its first position.

9. The invention of claim 6, wherein said transfer member support means comprises pin means mounted on said shroud means and said rotary disc is mounted for rotation on said pin means and wherein said container includes a conical end portion having an axial opening in its apex portion, said axial opening being positioned adjacent the peripheral edge portion of said rotary disc to permit a cricket to move through said axial opening into said recess when said rotary disc is in its first position wherein said shroud means includes a planar wall portion extending outwardly from said conical end portion at a location adjacent said axial opening in said conical end portion and cylindrical wall means concentrically surrounding said rotary disc.

10. The invention of claim 1, wherein the periphery of said rotary disc extends outwardly beyond a portion of the periphery of said shroud means and said second position of said rotary disc is a position in which the end of said recess opening is positioned outwardly of the periphery of the shroud means.

11. The invention of claim 10, additionally including a slot in said shroud means aligned with said recess when said disc is in its second position.

12. The invention of claim 11, wherein said recess extends only partially through the thickness of said disc.

* * * * *